INVENTOR
Ralph E. Marbury
BY 7. P. Ly/G
ATTORNEY

May 28, 1968  R. E. MARBURY  3,385,941
COMBINED PROTECTIVE GAP DEVICE AND BY-PASS SWITCH
FOR SERIES CAPACITOR INSTALLATIONS
Original Filed Aug. 18, 1964  7 Sheets-Sheet 5

May 28, 1968

R. E. MARBURY 3,385,941

COMBINED PROTECTIVE GAP DEVICE AND BY-PASS SWITCH
FOR SERIES CAPACITOR INSTALLATIONS

Original Filed Aug. 18, 1964

United States Patent Office 3,385,941
Patented May 28, 1968

3,385,941
COMBINED PROTECTIVE GAP DEVICE AND BY-PASS SWITCH FOR SERIES CAPACITOR INSTALLATIONS
Ralph E. Marbury, Bloomington, Ind., assignor to Westinghouse Electric Corporation, Pittsburgh, Pa., a corporation of Pennsylvania
Continuation-in-part of application Ser. No. 390,288, Aug. 18, 1964. This application Oct. 3, 1967, Ser. No. 672,643
9 Claims. (Cl. 200—148)

ABSTRACT OF THE DISCLOSURE

A combined overvoltage protective gap device and by-pass switch for series capacitors having a protective gap and a by-pass switch disposed in a common housing with common gas blast means for extinguishing arcs in the gap or between the switch contacts, thus combining overvoltage protection for a series capacitor with a by-pass switch having load break capability.

---

This application is a continuation of my prior copending application Ser. No. 390,288, filed Aug. 18, 1964.

The present invention relates to capacitor installations for series connection in alternating current transmission lines and, more particularly, to a load break by-pass switching and gap device employed therein for the purpose of providing capacitor by-pass and limiting capacitor overvoltage.

There are a number of applications in which it is desirable to connect a series capacitor installation in a transmission line. For example, in a distribution line a series capacitor installation can be used to compensate for line reactance and thus improve voltage regulation and provide substantial elimination of voltage dips otherwise appearing when heavy power equipment is connected to the line for starting purposes. In higher voltage transmission lines, and particularly in high voltage long distance transmission lines, a series capacitor installation can be used primarily to compensate for series inductive reactance in the line, and thus increase the power transmission limit of the line or control the division of power through parallel operating lines.

Thus, in producing reactance compensation, the series capacitor installation can be used primarily to provide economic load distribution between transmission lines operating in electrical parallel. Transmission losses are then reduced because the series capacitor installation causes power to be divided between the lines in inverse proportion to the line resistances rather than the line inductive reactances.

Perhaps more importantly, the reactance compensation provided by the series capacitor installation can significantly raise the power stability limit of a transmission line in which the installation is connected. Normally, the maximum power that can be transmitted over a transmission line (neglecting line resistance and shunt capacitance) is given by the formula $$P_{max.} = \frac{E_S \times E_R}{X}$$

where $E_S$ equals sending voltage and $E_R$ equals receiving voltage and X equals line inductive reactance. If power in excess of the maximum is attempted to be transmitted over the line, instability or load asynchronization can result from the interacting generating, transmission line and load parameters.

With the introduction of a series capacitor installation to compensate line inductive reactance (again neglecting line resistance and shunt capacitance), the maximum transmission power is given by $$P_{max.} = \frac{E_S \times E_R}{X - X_C}$$

where the new parameter $X_C$ equals capacitive reactance. With series capacitance, the power stability limit and correspondingly the power transmitting capacity of the transmission line are thus significantly increased.

The following are examples of the improvement which can be achieved (where percent compensation equals $X_C/X \times 100$):

(1) The power transmitting capacity of a line with 50% compensation is approximately equal to that of two separate lines of the same length and voltage without series capacitor compensation.

(2) A 138 kv. transmission line with 75% compensation is about equivalent to a 220 kv. transmission line without compensation insofar as power transmitting capacity is concerned.

(3) With 75% compensation, a 220 kv. transmission line is about equivalent to a 345 kv. transmission line without compensation insofar as power transmitting capacity is concerned.

Transmission line economic studies thus indicate a number of applications in which the cost of a series capacitor installation is low enough to be justified in terms of the advantages gained including the gain in transmitting power capacity.

Structurally, the series capacitor installation can comprise a plurality of capacitor units disposed in stacking frames which in turn are suitably arranged on foundation supported platforms. The capacitor units can be interconnected in parallel groups which in turn can be interconnected in series segments for connection to the transmission line. In addition, capacitor by-pass protection circuitry and switching and auxiliary apparatus can be provided in the installation. Hereinafter, in order to simplify the description, the term "capacitor unit" will be used to denote a single capacitor unit and the term "capacitor" will be used to designate one capacitor unit or a plurality of interconnected capacitor units. The term "capacitor bank" will be used to denote all or a large grouped fraction of all of the capacitor units in a given installation.

In a series capacitor installation, the capacitor units are normally provided with a voltage rating determined on the basis of normal capacitor voltage and a protective system including by-pass circuit means protects the capacitor against overvoltage under fault current conditions.

To provide adequate capacitor protection, the protective system must operate to by-pass the capacitor substantially instantaneously upon the occurrence of an overvoltage of predetermined magnitude, that is, the capacitor must be effectively by-passed within the first half-cycle of fault current. Arc gaps are thus normally used for protection purposes since no switch or other mechanical device involving moving parts can operate with the required speed.

In contrast to the use of a series capacitor installation in a power distribution line, where such installation is made primarily for voltage regulation and where some delay in restoration of the protectively by-passed capacitor can therefore normally be tolerated, a series capacitor installation in a high voltage long distance transmission line requires a more sophisticated capacitor protective system which reliably provides both for immediately by-passing the capacitor upon the occurrence of a line fault current and for reinserting the capacitor in the line immediately upon the termination of the fault condition. Thus, a primary aim in making a high voltage transmission line series capacitor installation attractive to utility customers is to provide an improved power stability limit as continuously as is possible compatible with protecting the capacitor against damage during abnormal line conditions.

The importance of this goal in transmission line engineering can perhaps be best understood by considering an example case where all or a substantial portion of the series capacitors in a given line are caused to be by-passed protectively during a period when the line is advantageously transferring power at a level above the unimproved line stability limit but below the improved stability limit achieved by the series capacitor installation. Restoration of the capacitor immediately after clearance of the line fault is then critical to the maintenance of stability.

One general circuit and structural approach taken in a series capacitor installation is presented in U.S. Patents 2,576,132, 2,584,716, 2,660,693, and 2,597,012. Briefly, in that scheme, a capacitor bank is divided into a plurality of series capacitor segments which are further subdivided into parallel capacitor groups or series-parallel capacitor groups, and an arc gap is connected in a by-pass path across each capacitor segment or each of a combination of capacitor groups within each capacitor segment. Such division of the capacitor bank allows for selection of series capacitance and for partial series capacitance service to the line even though a portion of the bank is protectively by-passed.

The gap breaks down and by-passes the associated capacitor immediately upon the occurrence of a predetermined overvoltage, thus holding the voltage across the associated capacitor to the arc voltage drop. The gap arc can be extinguished at each current zero or it can continue until normal line current is resumed. In either scheme of arc extinguishment, a blast of gas flows through the gap in such a manner as to deionize the gap space and extinguish the arc and when the overvoltage condition has terminated the associated capacitor is automatically restored to full effectiveness.

Additional protection is provided by a "disconnect" by-pass switch in parallel with each gap and it is biased to a closed position but normally held open. In response to certain abnormal conditions, such as a prolonged overvoltage on a capacitor, the associated by-pass switch is suitably tripped and the capacitor is then by-passed until necessary maintenance or bank switching is performed.

If maintenance is required, the entire installation is usually deenergized and isolated for the repairman's safety. Thus, a main high voltage load break switch or circuit breaker is tripped to by-pass the entire capacitor installation and disconnect switches are opened to provide the required isolation. Alternatively, the entire line can be deenergized for the same purpose.

If breaker isolation is used, only one breaker is normally employed for the entire installation because of the capital expense involved. That is, where the capacitor bank is provided with a plurality of capacitor segments for the reasons previously considered, a circuit breaker can often be economically provided to by-pass the entire capacitor bank but it is normally uneconomic to provide a circuit breaker in parallel with each arc gap and thereby divide the load breaking function among the resulting plurality of circuit breakers. After maintenance, the isolation disconnect switches are closed, the closed by-pass switches are reopened and the capacitor bank is serially reconnected in the line by opening the main circuit breaker.

If the fault condition in the line is corrected such that maintenance or repair is unnecessary, the main or bank circuit breaker nevertheless must be closed to provide for opening the closed by-pass switch or switches since these switches are not capable of interrupting load current. The bank circuit breaker is then reopened as in the preceding case and the series capacitor bank is restored to full effectiveness but with considerable inconvenience. The entire capacitor bank is totally by-passed for the period of time required to complete the procedure for reinserting one or more switch by-passed capacitor groups or segments in the capacitor bank. Series capacitance service to the transmission line is thus unavailable at a time when the need for such service may be critical and at a time when it is otherwise operationally unnecessary to by-pass the entire capacitor bank.

Finally, if it is desired to vary the amount of series capacitance from time to time, decreases can be achieved by tripping the appropriate number of by-pass switches in the bank. However, increases cannot be achieved simply by opening closed by-pass switches because of the load break limitation. Again, the bank breaker must be inconveniently used and series capacitance is thus totally unavailable during the time required for inserting the desired amount of capacitance.

Improved system and by-pass gap and switching performance are achieved through application of the principles of the present invention. Thus in accordance with these principles, a series capacitor installation comprises a capacitor bank divided into a plurality of series capacitors. A protective system for the capacitor bank comprises at least one gap means and at least one load break by-pass switch means cooperatively combined in a single device which is connected in a by-pass path across a capacitor and which is cooperatively organized with other such devices respectively connected across the other capacitors. Control means operate the devices in a manner which provides efficient capacitor protection as well as efficient series capacitance service to the transmission line.

With this arrangement, load breaking through a main circuit breaker can be eliminated since the load breaking function is distributed among the combination by-pass switching and gap devices and an appreciable economic gain through reduced capital expenditure can thus be realized in a series capacitor installation. Further, unless maintenance is required, the capacitor bank need not be by-passed when it is desired to reconnect serially in the transmission line a switch by-passed portion of the capacitor bank. As an added convenience to transmission line operation, capacitance can readily be removed from or inserted in the line by operation of the individual combination load break by-pass switching and gap devices according to line impedance needs or line phase balancing needs at any given point in time.

The combination device itself cooperatively includes at least a pair of switch contacts and a pair of gap electrodes. Gas blast means are also provided for deionizing the device intercontact and interelectrode space. The control means previously referred to provide for appropriate gas blast operation.

It is therefore an object of the invention to provide a novel series capacitor installation which provides efficient series capacitance service to the line while efficient capacitor protection is provided.

Another object of the invention is to provide a novel series capacitor installation which is economic to install and operate.

A further object of the invention is to provide a novel series capacitor installation wherein a plurality of load break by-pass switching and gap devices are efficiently employed such that series capacitance can be readily varied according to line impedance needs and such that at least partial capacitance service can be continuously provided to the line even though a portion of the capacitor bank is temporarily switch by-passed because of a temporary fault.

It is another object of the invention to provide a novel load break by-pass switching and gap device which efficiently provides both load break switching and gap breakdown and arc extinguishment action.

A further object of the invention is to provide a novel load break by-pass switching and gap device in which the gap arc and at least the switch opening arc are efficiently extinguished by common arc extinguishing means.

These and other objects of the invention will become more apparent upon consideration of the following detailed description along with the attached drawings, in which.

Figure 1:
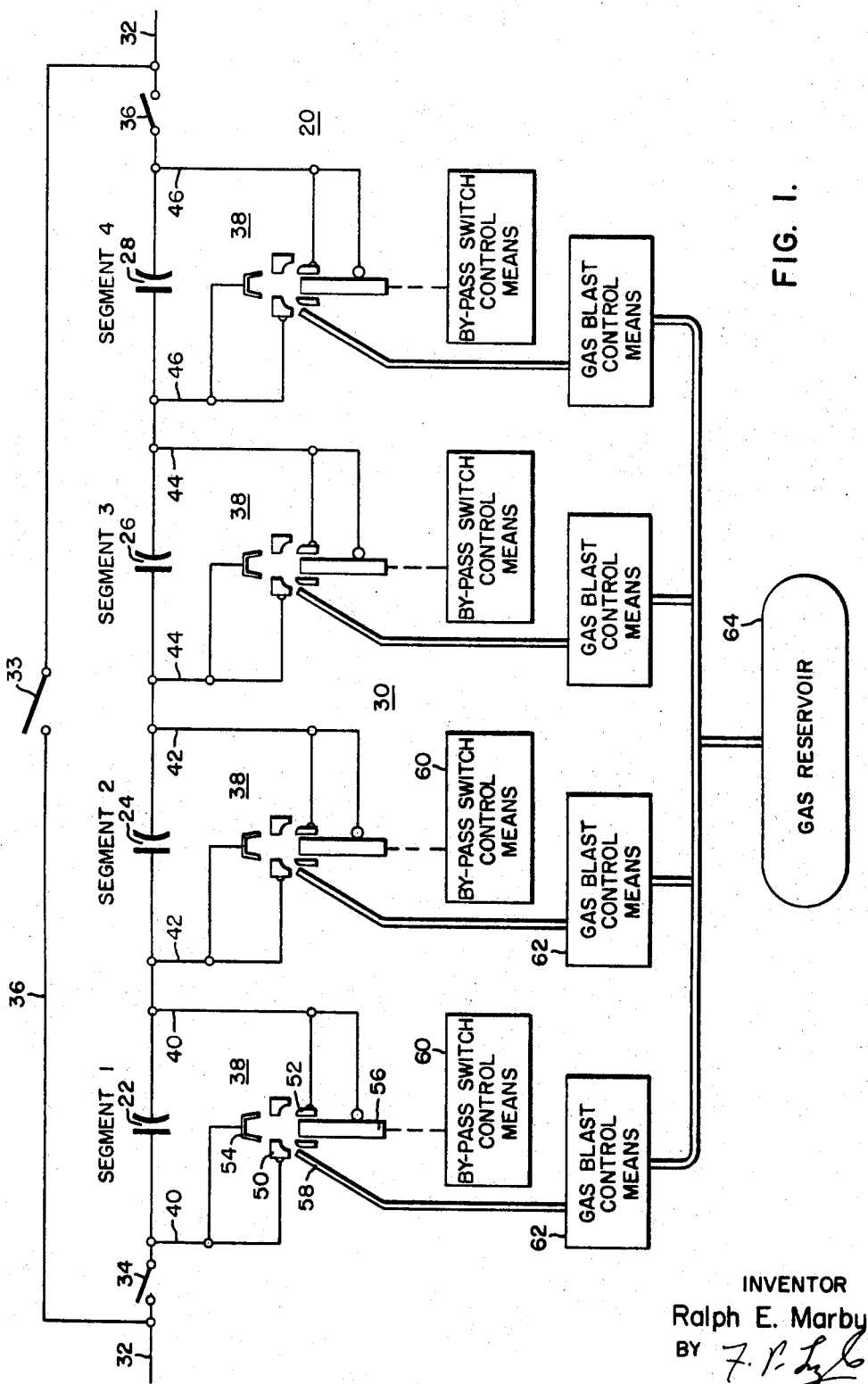
FIGURE 1 is a schematic view of one phase of a series capacitor installation constructed and arranged in accordance with the principles of the invention.

More specifically, there is schematically illustrated in FIG. 1 a series capacitor installation 20 comprising segment capacitors 22, 24, 26 and 28, designated as segments 1, 2, 3 and 4 respectively, and a capacitor by-pass protective system 30 which are all arranged and constructed in accordance with the principles of the invention. Each of the capacitors 22 24, 26 or 28 can comprise a plurality of capacitor units as previously explained, and these capacitors are serially connected in transmission line 32 indicated as phase A. It is to be understood that in a three phase transmission line phase B and phase C lines (not shown) would be provided with series capacitance and capacitor by-pass protection in a manner similar or identical to that provided for the phase A line 32.

The series capacitor installation 20 is indicated in this instance as having four capacitor segments in each phase line only for the purpose of illustration. More or fewer capacitor segments can be provided in each phase line if desired. Preferably, however, at least three or more capacitor segments are provided in each phase line so as to gain the series capacitance service advantages previously outlined. In any event, all of the capacitor units which form the various capacitor segments in the various phase lines form a capacitor bank which can be physically disposed on platforms at the installation location in accordance with the usual stacking procedure. If the size of the series capacitor installation 20 warrants, a plurality of capacitor banks and associated protective systems 30 can be interconnected in series or parallel according to design needs.

To provide for safety during maintenance periods, a shunt disconnect switch 33 is connected in the line 32 across the capacitors 22, 24, 26 and 28 and isolation disconnect switches 34 and 36 are connected in series with the same capacitors at opposite circuit ends thereof. When it is desired to perform maintenance, the shunt switch 33 is closed to provide continuity for the phase A line 32 in shunt path 36 across the capacitors 22, 24, 26 and 28. The isolation switches 34 and 36 are then opened and capacitor maintenance can be performed. After maintenance, the isolation switches 34 and 36 can be reclosed and the disconnect switch 33 can be reopened, and for this purpose the switch 33 need not have load break character for reasons which will subsequently become more apparent. Similar or identical disconnect switching service (not shown) can be provided for the other phase lines.

The protective system 30 is provided for selectively by-passing or for protecting the capacitors 22, 24, 26 and 28 against overvoltage conditions produced by fault currents in the line 32. The system 30 includes a load break by-pass switching and gap device 38 connected across each capacitor 22 or 24 or 26 or 28 in by-pass protection path 40 or 42 or 44 or 46.

Each device 38 comprises an arc gap formed by gap electrodes 50 and 52 which are suitably set for sparkover at a predetermined overvoltage condition across the associated capacitor 22 or 24 or 26 or 28. The device 38 further includes load break switch contacts 54 and 56, and the switch contact 56 is movable through the interelectrode gap space. Generally, one operating advantage which is gained by common arc space utilization for the electrodes 50 and 52 and the contacts 54 and 56 is that a single gas blast means 58 can be employed both for the purpose of extinguishing an arc between the gap electrodes 50 and 52 and for the purpose of extinguishing a load breaking arc between the switch contacts 54 and 56 whenever the movable switch contact 56 is moved from a closed to an open position. More importantly, though, the interrelated contact and electrode structure provides a basis for excellent load interrupting capacity for the switch contacts 54 and 56 as will subsequently be considered.

To control the operation of each movable switch contact 56, by-pass switch control means 60 are interconnected with each device 38. For example, the movable switch contact 56 of each device 38 can be spring biased to a closed position but normally latched in an open position and the switch control means 60 can be responsive to various conditions to trip the movable switch electrode 56 into a closed contacting relationship with the fixed switch contact 54. Principally, the conditions under which the control means 60 trip the movable electrode 56 preferably include a sustained capacitor overvoltage, an excessive arc current between the gap electrodes 50 and 52 or loss of gas pressure in the gas blast means 58. Illustrations of the specific manner in which the switch control means 60 can be embodied will become evident when the specific embodiments of FIG. 2 and FIGS. 4–11 are described.

Gas blast control means 62 provide for automatic delivery of gas from reservoir 64 to the gas blast means 58 in each device 38. To provide for efficient series capacitance service to the line 32 the gas blast control means 62 automatically extinguishes a by-pass arc between the gap electrodes 50 and 52 shortly or immediately after the line fault current which initiated the arc is remedied.

If the gas blast control means are arranged to operate in the manner indicated in the previously referenced U.S. Patent 2,660,693, the arc is extinguished at each current zero during the period of the fault current condition and the arc is thus extinguished at the first current zero after the time at which the current fault is remedied. In the pertaining art, the speed at which series capacitance service is restored is thus commonly characterized as "instantaneous." However, the fact that the gap arc is extinguished at each current zero during the current fault period results in capacitance service to the line 32 during a portion of each half cycle and the resulting impedance variation as a function of time can adversely affect the operation of distance relays.

To avoid the latter problem, the gas blast control means can be arranged and operated to provide for extinguishing the arc between the gap electrodes 50 and 52 only after the fault current has dropped to a predetermined value. Capacitance service is then withheld from the line 32 during the period of flow of excessive fault current and it is restored only when the fault current drops to the predetermined value. Such restoration is automatic and it is commonly characterized as "fast" restoration to distinguish it from the type of restoration provided by the preceding example. A more thorough description of the latter control arrangement is set forth in a copending application Ser. No. 400,472 filed on Sept. 30, 1964, by W. H. Cuttino and assigned to the present assignee.

As previously indicated, the gas blast means 58 also provide for deionizing the space between the switch contacts 54 and 56 at least when the movable contact 56 is moved from a closed to an open position in relation to the fixed contact 54. If desired, the gas blast means 58 can also provide deionizing gas flow during closing movement of the switch contacts 54 and 56.

In operation, the series capacitor installation 20 provides efficient series capacitance service to the line 32 while efficient protection is provided for the capacitors 22, 24, 26 and 28. Thus, since a load break by-pass path is provided across each capacitor 22 or 24 or 26 or 28, capacitance can be inserted into or removed from the line 32 for phase balancing purposes or for the purpose of increasing or decreasing the amount of series capacitive reactance in the line.

Further, one or more of the capacitors 22 or 24 or 26 or 28 can be by-passed through the associated gap electrodes 50 and 52 or through the switch contacts 54 and 56 as a result of a local overvoltage or other condition while the balance of the capacitors continue to provide series capacitance service to the line 32. If the local overvoltage condition should then be remedied without requiring maintenance, the associated switch contacts 54 and 56 can be reopened because of their load break character so as to reinsert the protected capacitor without interrupting the continuity of series capacitance service from the other capacitors.

The load break by-pass switching character of the devices 38 is the principal factor underlying the system capacitor switching and capacitor protection operation described. Since the devices 38 provide automatic by-pass gap protection and by-pass switch protection for the capacitors individually or in combination with common gas blast means employed for arc extinguishment, an overall efficient system is provided for connecting series capacitors in the line 32 while simultaneously providing for protection of the capacitors.

Figure 2:
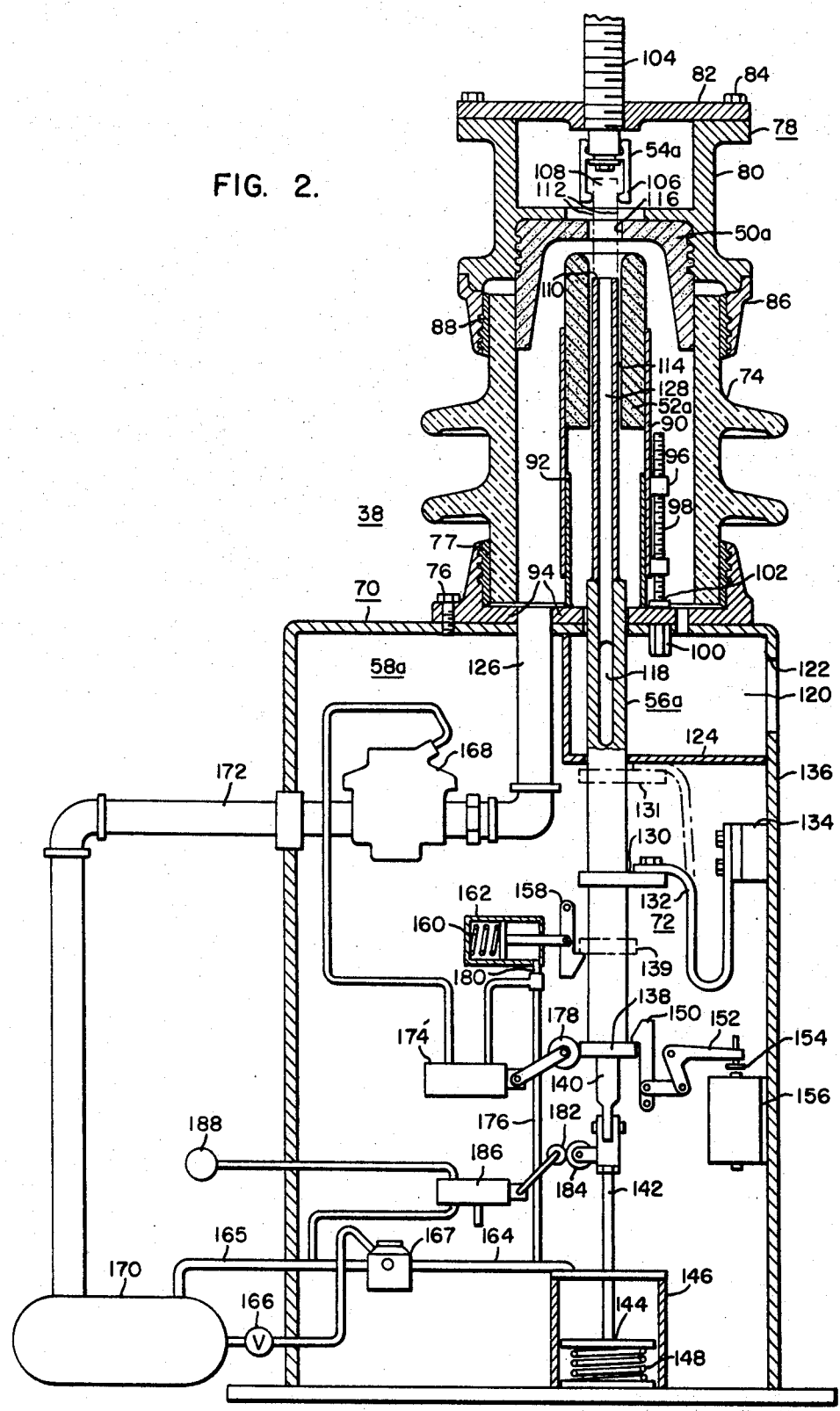
FIG. 2 is an elevational view of a load break by-pass switching and gap device with portions thereof removed, and it is constructed in accordance with principles of the invention for employment in the series capacitor installation shown in FIG. 1.

To provide for the system operation described for the series capacitor installation 20, the load break by-pass switching and gap device 38 can be embodied as shown in FIG. 2. In this embodiment of the invention, there is provided a metallic supporting base 70 in which there is disposed gas blast means 58a and operating means 72 for movable switch contact 56a. The switch operating means 72 comprises a portion of the switch control means 60 referred to in FIG. 1.

A housing 74 is mounted by suitable means 76 on top of the supporting base 70, and within the housing 74 there are provided upper and lower gap electrodes 50a and 52a, and fixed switch contact 54a and the movable switch contact 56a which is provided in the form of an elongated tubular rod. To provide for operation by the operating means 72, the switch rod 56a extends from the housing 74 into the supporting base 70. Cover means 78 are disposed on and suitably secured to the porcelain housing 74, and it includes a generally tubular cast metallic member 80 on which there is secured a top plate 82 by suitable means 84. In turn, the tubular member 80 is secured to the top of the porcelain housing 74 by suitable means such as adapter ring 86 and sealing means 88.

The gap electrode 50a is formed from an electrode material such as graphite and it is a generally cup-shaped member with the open side of the cup cavity facing downwardly. It is suitably secured in place within the housing 74, such as by a threaded engagement with the tubular cover member 80. The gap electrode member 52a is also formed from a material such as graphite and it is generally elongated and tubular with one of its ends disposed within the cup cavity of the gap electrode 50a and with the other end extending downwardly therefrom. The tubular gap electrode 52a is supported in place in relation to a sliding supporting tube member 90 which in turn is guided on fixed tubular supporting member 92 which is welded or otherwise secured to base plate 94 of the porcelain housing 74. Securing means 76 extend through the base plate 94 to secure it to base supporting member 70 while sealing means 77 are employed to secure the base plate member 94 to the porcelain housing 74.

The sliding supporting tubular member 90 is provided with a threaded guide 96 in engagement with threaded shaft 98 for the purpose of providing adjustment in the spacing between the gap electrodes 50a and 52a. The shaft 98 extends downwardly through the base plate 94 with an adjustment knob 100 provided on the underside of the base plate 94. When the desired gap spacing is obtained, lock nut 102 is tightend to fix the location of the guide 96 on the shaft 98 and thereby to fix the gap spacing.

The fixed switch contact 54a is formed from a material such as silver coated brass and it is suitably secured to terminal member 104 which in turn is secured, as by threading, to cover plate 82 and extends thereabove for connection in a capacitor by-pass path such as the path 40 in FIGURE 1. Further, the fixed switch contact 54a is generally cup-shaped and is provided with a plurality of downwardly extending resilient contact fingers 106 which form cup cavity 108 wherein end portion 110 of the switch rod 56a is disposed when the contact 54a and the rod 56a are closed as indicated by the dotted lines 112. To provide for the switch contact movement just described, the switch rod 56a extends upwardly through central opening 114 in the lower gap electrode 52a which in turn is aligned with central opening 116 in the upper gap electrode 50a.

Further, the switch rod 56a is provided with a vent slot 118 which directs exhaust gas flow into vent chamber 120 and through discharge port 122 to the device exterior. The vent chamber 120 is suitably bounded by wall means 124 formed on the supporting base 70.

The exhaust gas is derived from a gas conduit 126 of the gas blast means 58a whenever it is desired to extinguish an arc between the gap electrodes 50a and 52a or whenever the switch rod 56a is actuated from a closed to an open position. Although normally not necessary, incoming gas flow can also be provided when the switch rod 56a is actuated from an open to a closed position. The conduit 126 is suitably secured in relation to the supporting base 70 and the housing base plate 94 so as to direct incoming gas upwardly into the inter-electrode gap space and from there downwardly through the gap electrode channel 114 and downwardly through tubular switch rod exhaust channel 128 and the rod vent 118.

In this instance, the lower portion of the switch rod 56a is provided with a terminal flange 130 within the space enclosed by the supporting base 70. The terminal flange 130 is then connected through suitable movable means such as a movable conductive cable 132 to terminal block 134 on frame means or side wall 136 of the supporting base 70. The terminal block 134 can be suitably connected in a capacitor by-pass path such as the by-pass path 40 in FIGURE 1.

In addition, the switch rod 56a is provided with latching flange 138 adjacent the lower end portion 140 for the purpose of enabling the switch rod 56a to be latched in open or both open and closed positions. The rod end portion 140 in turn is mechanically interconnected through tie-rod 142 to piston 144 in operating cylinder 146. Spring means 148 normally urge the piston 144 upwardly so that the switch rod 56a is urged toward a closed position (as indicated by reference character 139 for the dotted latching flange outline and reference character 131 for the dotted connector flange outline).

Normally, however, the switch rod 56a is held in an open position by means of engagement of latch member 150 with the rod latching flange 138. The latching member 150 in turn is interconnected through mechanical link system 152 to elongated trip bar 154 (elongated in a direction normal to the plane of the FIG. 2 drawing sheet). Trip means 156 provide for actuating the trip bar 154 and releasing the latch member 150 so as to allow the switch rod 56a to close under the force of the spring means 148.

Another latching member 158 can be employed to latch the rod 56a in the closed position 139. Spring means 160 in air cylinder 162 normally urge the latching member 158 toward the switch rod 56a and into engagement with the rod latching flange 138 when the rod 56a is in the closed position 139. To release the latching member 158 when it is desired to open the switch rod 56a, gas pressure is delivered into the cylinder 162 so as to compress the spring means 160 and thereby withdraw the latching member 158 from engagement with the rod latching flange 138.

When the latching member 158 is used, its main function is to restrain the rod 56a from opening during a time delay period while gas pressure can build up in the switch rod operating cylinder 146 from conduit 164 after control valve 166 (suitable commercially available design) is actuated. In many cases however, such as in the embodiment of FIG. 4, the latching member 158 and the air cylinder 162, or their equivalents, can be eliminated if the force required to separate the switch rod 56a from the fixed switch contact 54a is sufficiently great to require substantial air pressure build up in the operating cylinder 146 before switch contact separation is achieved. For example, where the air pressure in conduit 164 was delivered at 135 p.s.i. in one constructed embodiment of the invention, and where the force required to separate the switch rod 56a from the fixed switch contact 54a was 100 pounds, the restraining latch 158 could be eliminated since the pre-operating pressure build up in the operating cylinder 146 was sufficient to produce swift separating movement of the switch rod 56a once separating switch contact movement was initiated.

When the device 38 is connected for circuit operation, the initial separating movement of the switch rod 56a from the fixed switch contact 54a draws an arc between the two switch contacts. Simultaneously, since the upper gap electrode 50a and the switch contact are at the same potential (see path 40, FIG. 1) or at substantially the same potential (as in case of embodiment of FIG. 7), arc current flows between the rod 56a and the upper gap electrode 50a through the tolerance of wider space therebetween.

As the switch rod 56a moves downwardly under the influence of gas pressure against the operating cylinder piston 144, the total arc current begins to transfer from the switch contact 54a to the upper gap electrode 50a thereby providing protection for the switch contact 54a against arc damage. As the switch rod 56a moves further downward, the arc is drawn into the lower gap electrode 52a and is extinguished by a blast of gas passing through the space between the electrodes 50a and 52a and into the tubular electrode 52a and switch rod 56a. During the period of the switch movement just described, gas or air blast is delivered from the conduit 126 in the inter-electrode gap space to provide for arc quenching and extinguishment. Gas exhaust is provided through the switch rod 56a as previously described. Because of the manner in which the switch contact separation is achieved, the device 38 can be provided with a continuous current rating of 2000 amperes or more, depending upon the geometry and material design provided, and is capable of interrupting this current.

To provide for gas or air blast during the switch opening movement, the gas blast means 58 include a solenoid and pressure controlled valve 168 (suitable commercially available design) which is connected to the conduit 126 and to gas reservoir 170 through conduit 172. The gas reservoir 170 also can provide the gas needed for operating the switch operating cylinder 146 through conduit 165 and pilot valve 167 (suitable commercially available design) and conduit 164 as controlled by the previously noted valve 166. The valve 167 preferably is a three-way valve providing for exhausting the conduit 164 when it is closed, and if desired it can be connected to a ground level reservoir (not shown) instead of the reservoir 170.

Two-way valve 174 (suitable commercially available design) is connected through conduit 176 to the conduit 164 so as to provide signal pressure for operating the gas blast valve 168 when gas pressure is delivered to the operating cylinder 146 to open the switch rod 56a from a closed position. For this purpose, cam operator 178 for the two-way valve 174 is in actuated position when the switch rod 56a is in its upper closed position. Thus, the two-way valve 174 is free to deliver gas pressure to operate the gas blast valve 168 with the appearance of switch opening pressure in the conduit 164.

The air cylinder 162 is also connected to the conduit 176 through conduit 180 so that its time delay operation in releasing the restraining latch member 158 is also begun when switch opening pressure is delivered to the conduit 164. When the switch rod 56a approaches its open position, the cam operator 178 is actuated to close the (two-way) valve 174 and the gas blast valve 168 is then de-actuated to turn off the gas blast through the inter-electrode gap space.

Simultaneously, cam actuator 182 can be actuated by cam means 184 so as to deliver pressure from conduit 165 through three-way valve 186 (suitable commercially available design) to indicator means 188 for the purpose of indicating the fact that the switch is in the open position. The indicator means for example can be an ordinary signal lamp operated by circuitry responsive to pressure delivery. In addition, the three-way valve 186 can deliver pressure to a pressure switch (not shown) or the like and the pressure switch can then be effective to deenergize the control valve 166 and the three-way valve 167 and thereby exhaust the conduit 164. When the conduit 164 is exhausted, the air cylinder 162 is returned to its original position and reduced pressure appears above the operating cylinder piston 144 but since the switch closing latch 150 is in latched engagement with the switch latching flange 138 the rod 56a is held in open position against the force of the spring means 148.

To place the device 38 in operation, it is connected across a capacitor in a by-pass path, such as the by-pass path 40 of FIGURE 1, and the capacitor normally is series connected in the transmission line but is by-passed by an arc discharge between the gap electrodes 50a and 52a when an overvoltage develops across the capacitor. The arc current between the gap electrodes 50a and 52a then can either be extinguished at each current zero or only when the line fault current drops down to a low enough value to warrant capacitor reinsertion in the line. In this case, the gas blast valve 168 is also provided with a solenoid control (not shown) which opens the valve 168 to deliver gas blast according to the gap arc extinguishment control desired. Specific circuit structure suitable for gas blast control aimed at providing arc extinguishment only when the fault current has dropped to a predetermined value is considered more fully in the previously noted copending application of W. H. Cuttino. To provide gas blast control which provides for arc extinguishment at each current zero, control circuit structure similar to that set forth in referenced U.S. Patent 2,660,693 can be employed.

The switch rod 56a is normally in open position and is tripped to a closed position only in response to certain conditions such as (1) excessive or prolonged capacitor overvoltage; (2) unbalance in a single group of capacitor units protected by the device 38 as a result of a blown fuse or the like; (3) excessive fault current between the gap electrodes 50a and 52a; (4) loss of gas pressure in the system. For the purpose of tripping the trip bar 150 and unlatching the switch rod 56a, the trip means 156 are indicated generally for this purpose and it is to be understood that several different units can be arranged side by side for the purpose of actuating the trip bar 154 respectively in response to the system conditions just indicated or to other similar system conditions. A description of specific structure for this purpose will be set forth more fully in connection with the embodiment of FIG. 4.

Figure 3:
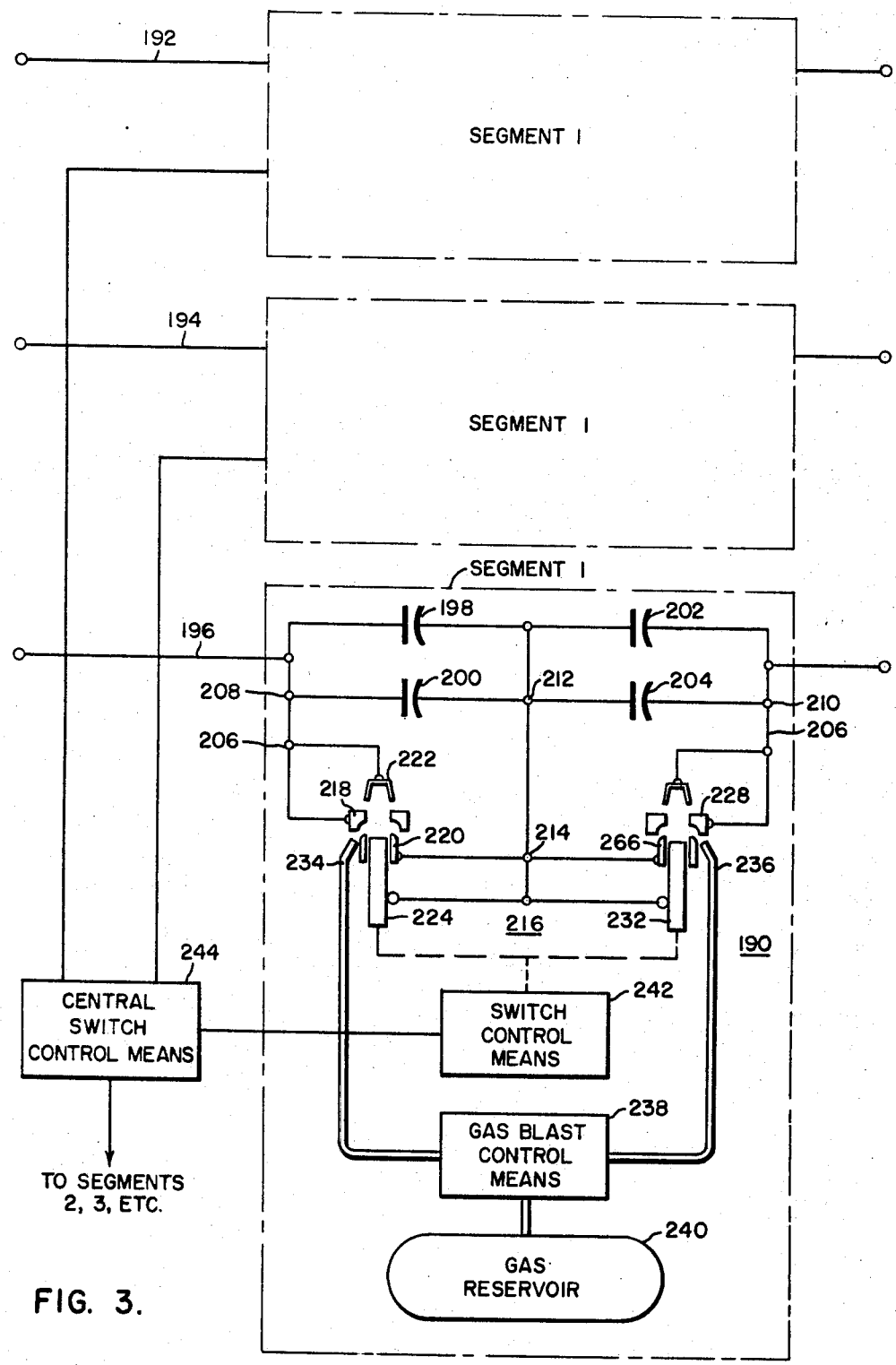
FIG. 3 is a schematic diagram of one of a plurality of capacitor segments in each of three phases of another series capacitor installation constructed and arranged in accordance with the principles of the invention.
Figure 4:
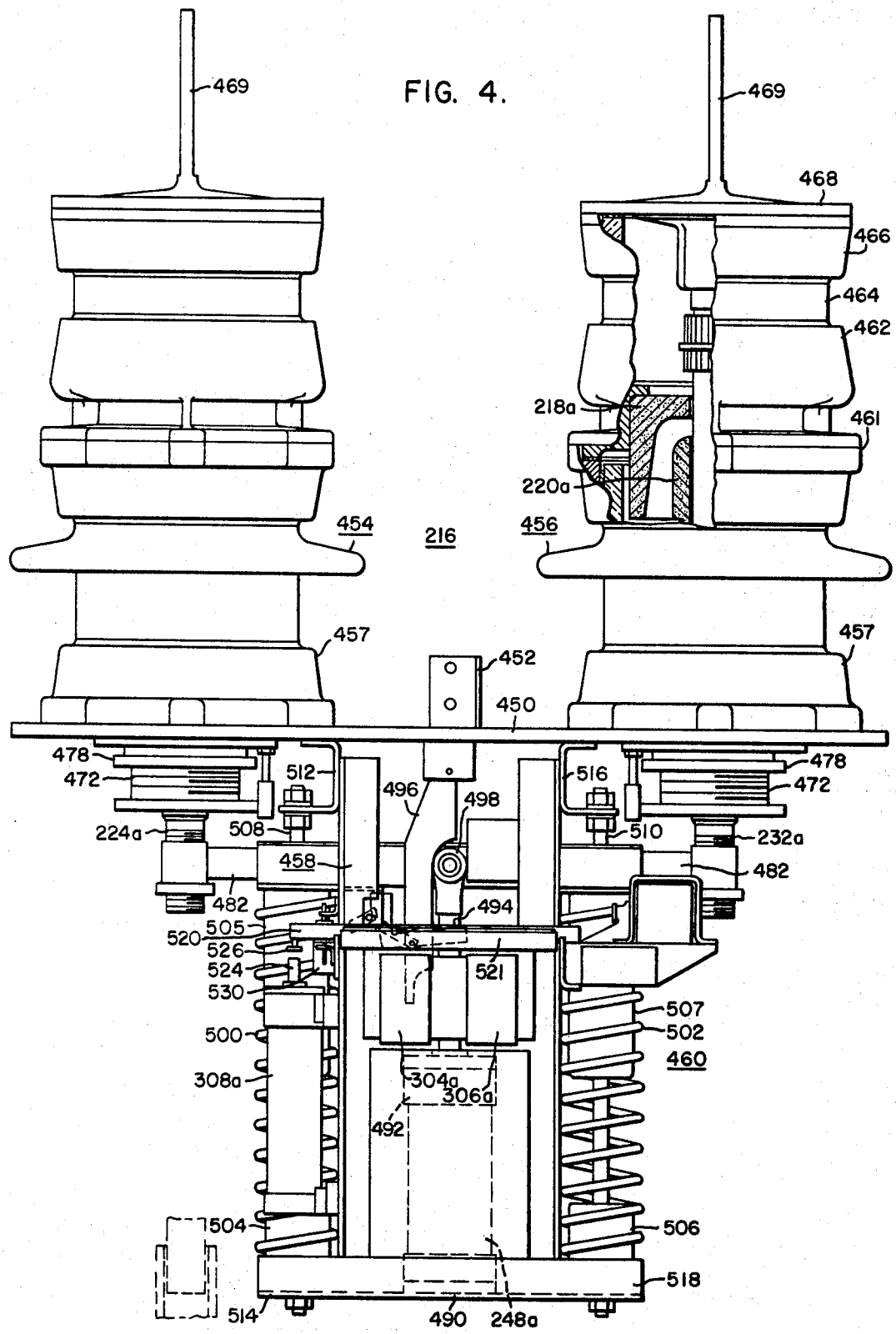
FIG. 4 shows an elevational view of another load break by-pass switching and gap device with portions thereof removed, and it is employed in the installation of FIG. 3.
Figure 5:
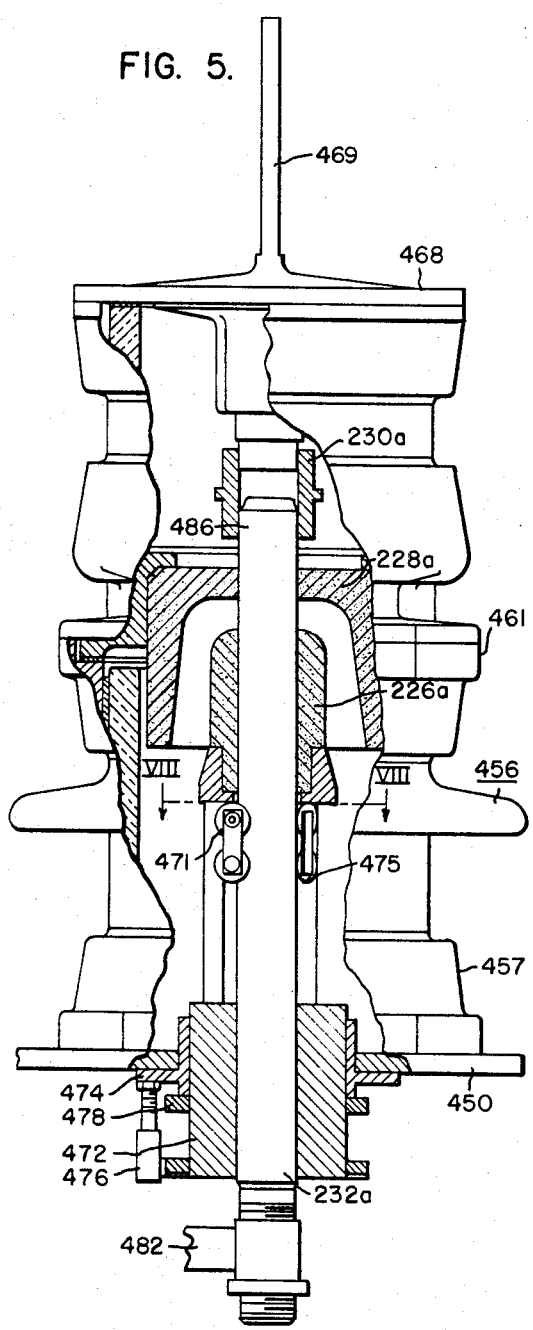
FIG. 5 shows an enlarged elevational view of a switch and gap portion of the device of FIG. 4, and it is shown with portions thereof removed and with the switch in a closed position.
Figure 6:
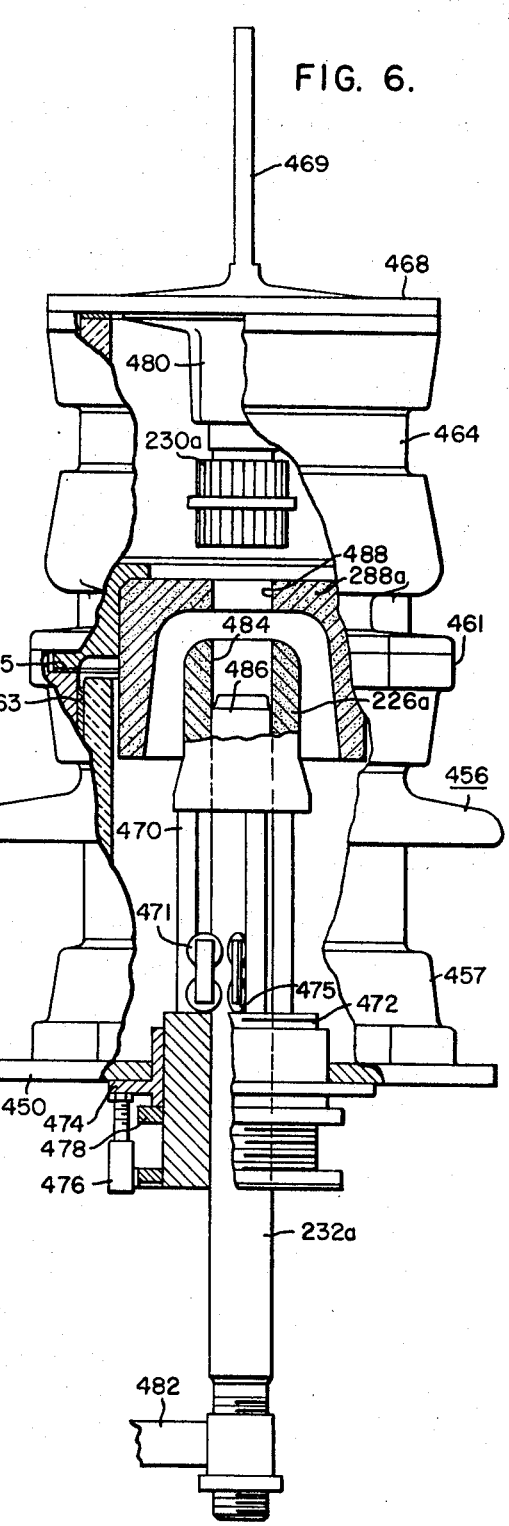
FIG. 6 shows a view similar to the view of FIG. 5 but the switch in this case is in an open position.
Figure 7:
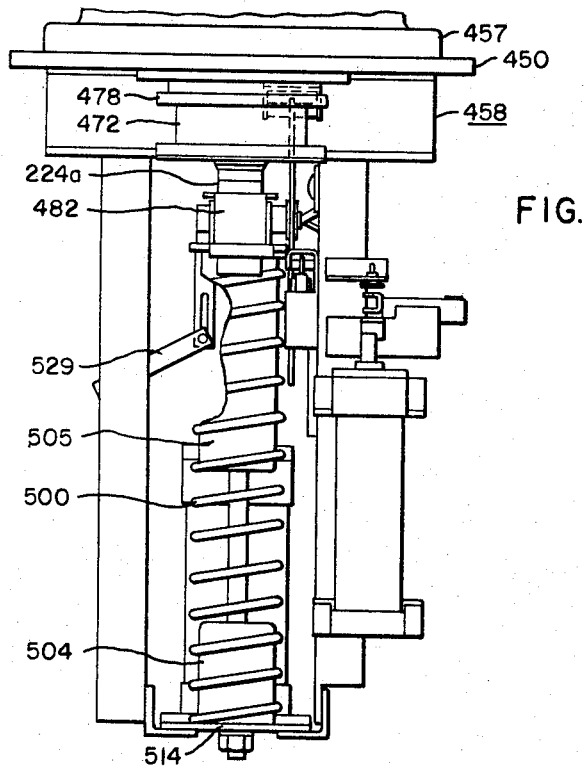
FIG. 7 shows an elevational view of an operating mechanism forming a portion of the device of FIG. 4.

In FIG. 3 there is shown another embodiment of the invention in the form of a series capacitor installation 190. In this case, one capacitor segment in each of three phase lines 192, 194 and 196 is shown rather than a plurality of capacitor segments in a single phase line as was the case in FIGURE 1. Each capacitor phase segment is provided with capacitors 198, 200, 202 and 204. By-pass path 206 is connected across terminals or junctions 208 and 210 of each segment capacitor combination, and the capacitors 198 and 202 and the capacitors 202 and 204 are respectively connected in parallel to circuit junction 212 which in turn is connected to circuit junction 214 in the by-pass path 206.

A dual load break by-pass switching and gap device 216 is connected in the by-pass path 206. It is provided with gap electrodes 218 and 220 and switch contacts 222 and 224 between the circuit junctions 208 and 214 and gap electrodes 226 and 228 and switch contacts 230 and 232 are connected between circuit junctions 210 and 214. The device electrodes and contacts 218, 220, 222, 224 thus form a switch and gap by-pass path across the parallel capacitors 198 and 202 and the device electrodes and contacts 226, 228, 230 and 232 form a switch and gap by-pass across the parallel capacitors 202 and 204.

Gas blast means 234 and 236 are operated by gas blast control means 238 for the purpose of arc control in the respective electrode and contact combinations. A gas reservoir 240 provides a source of gas for the gas blast means 234 and 236.

The device 216 is characterized as "dual" because the respective electrode and contact combinations are provided in a single unit and the switch electrodes 224 and 232 are jointly mechanically operated by single switch control means 242. As a consequence of the common mechanical operation, the entire phase segment capacitor combination is switch by-passed even though by-pass switch closing may be needed only for protecting the capacitors 198 and 202 or the capacitors 202 and 204. However, installation economy can be achieved with the employment of the dual device 216 since all of the capacitors 198, 200, 202 and 204 may be installed on a single elevated platform and only a single by-pass switch and gap device need then be provided on the platform.

The switch control means 242 in each of the three phase lines 192, 194 and 196 are interconnected through central switch control means 244 which, as one principal operating feature, maintains impedance balance among the phase lines 192, 194 and 196. Impedance balancing occurs when the switch control means 242 mechanically closes or opens the movable switch contacts 224 and 232 in one of the phase capacitor segments and, upon this occurrence, the central switch control means 244 causes the switch control means 242 in the corresponding capacitor segments in each of the other phases mechanically to operate the associated movable switch contacts 224 and 232 in the same manner. Thus, all of the switch contacts 224 and 232 in any given segment of all the phases are always either in an open or in a closed position to provide phase impedance balancing. Phase unbalancing effects of gap electrode arcing in one of the phase capacitor segments normally is neglectable and therefore the control means 244 is not in this case arranged to offset such effects. For a fuller description of the switch control means 242 reference is made to the aforementioned Cuttino application. For a fuller description of the control switch control means 244, reference is made to another copending application Ser. No. 403,097, filed on Oct. 12, 1964, by W. Cuttino and assigned to the present assignee.

The load break by-pass switch and gap device 216 employed in the series capacitor installation 190 is shown in greater structural detail in FIGS. 4–11. The device 216 is provided with a base plate 450 on which there is provided a circuit connecting terminal 452. Above the base plate 450 there are supported a pair of spaced porcelain gap and switch housings 454 and 456. Frame means 458 are disposed below the base plate 450 for supporting means 460 which operate switch rod contacts 224a and 232a extending downwardly from the housings 454 and 456.

Only the housing 456 and structure associated therewith will be described since the other housing 454 and the structure associated with it are identical. The housing 456 is secured to metallic base member 457 which in turn is suitably secured by bolts or the like to the base plate 450. A metallic tubular cover member 462 is disposed on and secured by suitable sealing means 463 to insulative ring member 461 which in turn is disposed on and secured by suitable sealing means 465 to the housing 456. An insulative tubular member 464 and metallic cap and top plate members 466 and 468 are disposed on and secured in relation to the insulative member 464. A terminal 469 projects upwardly from the top plate 468 for circuit connection to junction 208 or 210 in FIG. 3.

A graphite upper gap electrode 228a is secured to the metallic cover member 462, and lower gap electrode 226a is supported on a plurality of vertically extending conductive posts 470 (FIGS. 6 and 8) which in turn are supported on threaded tubular support member 472. The threaded support member 472 is disposed in threaded relation with and extends through threaded base boss member 474 which is welded or otherwise secured to the base plate 450. A gauging knob 476 can be employed for the purpose of indicating the extent to which the threaded support member 472 is raised or lowered in relation to the boss 474 and the base plate 450. Calibrated adjustment in the inter-electrode gap space between the gap electrodes 228a and 226a is thus provided. When the desired spacing is achieved, locking nut 478 is tightened against the boss member 474.

The top plate 468 is provided with a depending portion 480 to which there is conductively and mechanically secured a finger contact 230a corresponding to the switch contact 230 in FIG. 3. The tubular switch contact or rod 232a extends in the vertical direction and is supported adjacent its bottom end portion by a switch operating bar 482 which extends generally in the horizontal direction also to support tubular switch rod 224a adjacent its bottom end portion.

Figure 8:
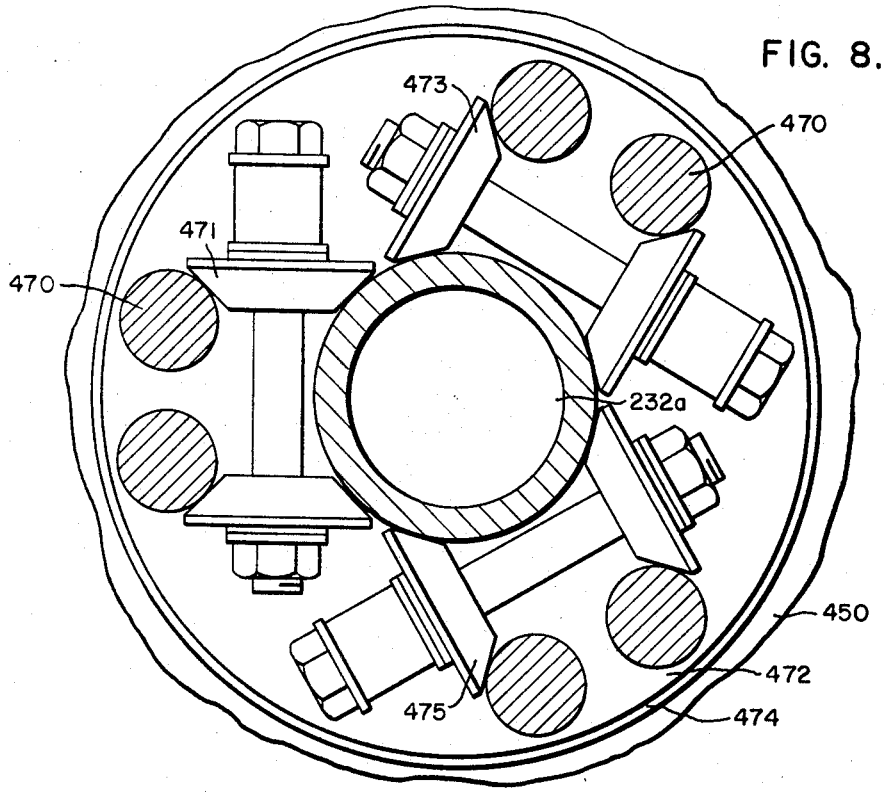
FIG. 8 shows a portion of a cross-section taken along the reference line VIII—VIII of FIG. 5.

The switch rod 232a extends through an opening in the threaded support member 472 and through the space located within the plurality of supporting posts 470 into channel 484 in the lower gap electrode 226a. As shown in FIG. 8, a conductive connection is established at all times between the switch rod 232a and the gap supporting posts 470 by means of respective movable rollers 471, 473 and 475. These rollers fit relatively tightly, but, as can be observed by comparing FIGS. 5 and 6, can roll in the vertical direction in correspondence to the movement of the switch rod 232a.

When the switch rod 232a is in closed position (FIG. 5), switch rod portion 486 extends through channel 488 in the upper gap electrode 228a into engagement with the fixed finger switch contact 230a. When the switch rod 232a is actuated to an open position (FIG. 6), it first separates from the fixed finger switch contact 230a and thereby draws an arc which, similarly to the previous embodiment, is transferred to the upper gap electrode 228a as the switch rod portion 486 passes therethrough. As the switch rod 232a moves to its open position, the arc is transferred to flow between the gap electrodes 228a and 226a. During the opening operation, gas or air is blasted through the gap inter-electrode space by the blast means 236 through a port (not shown) in the base plate 450 and sufficient deionization is thus provided to characterize the switch contacts 230a and 232a with substantial load break rating. As in the previous embodiment, blast gas is exhausted through the hollow in the switch rod 232a, but in this case an extension (not shown) can be provided on the lower end of the rod 232a and it can be disposed in telescopic relation to an exhaust conduit (not shown).

The insulative member 464 electrically separates the fixed switch contact 230a and the upper gap electrode 228a so that arc current is delivered through a suitable circuit path (not shown) in the gas blast control means 238 whereby an arc extinguishing gas blast is then produced. In this manner the contact 230a and electrode 228a are substantially at the same potential to promote the described interelectrode arcing while desired control functioning is simultaneously provided. Details regarding gas blast control in a capacitor by-pass path in which the device 216 can be employed can be obtained in the first mentioned Cuttino application.

To operate the switch bar 482, a switch operating cylinder 248a is fixedly secured to frame base 490 and is provided with an operating piston 492 mechanically interconnected with the switch operating bar 482 by suitable means 494. When the switch operating bar 482 is in the position indicated in FIG. 4, the switch rods 224a and 232a are in closed position. To open the switch rods 224a and 232a, air pressure is delivered to the operating cylinder 248a, for example under conditions and in a manner indicated in the noted Cuttino applications. The switch operating bar 482 is then rapidly lowered and latching member 496 engages latching knob 498 projecting laterally outwardly from the switch operating bar 482 (see FIG. 10). The switch operating bar 482 is lowered against upward spring pressure produced by respective coil springs 500 and 502 which are disposed about guide means 504 and 506 secured by respective rod and bolt means 508 and 510 to upper and lower frame portions 512, 514 and 516, 518, respectively. Guide means 505 and 507 also respectively extend downwardly from the operating bar 482 through the rod means 508 and 510 and within the springs 500 and 502.

A trip bar 520 (FIG. 4) is provided for pivoting the latch member 496 into an unlatched position so as to allow rapid closing movement of the switch rods 224a and 232a under the force provided by the coil springs 500 and 502. The trip bar 520 is suitably mounted for limited pivotal movement on the frame means 458 so as to operate toggle means 522 (FIGS. 9–11) which are interconnected with the latching member 496.

Solenoids or air cylinders or other devices can be suitably mounted in relation to the frame means 458 for the purpose of tripping the trip bar 520 to close the switch rods 224a and 232a. For example, air cylinder 308a (FIG. 4) is in this case mounted on frame means 458 and is provided with cylinder rod 524 which, on loss of system air pressure, can be pushed upwardly to engage trip bar portion 526 and thereby upwardly pivot the trip bar 520 which in turn engages toggle means actuating portion 528 (FIG. 10) to trip the latching member 496 through the toggle means 522.

Similarly, overvoltage and overcurrent trip solenoids 306a and 304a can be suitably mounted, say on frame member 521, in relation to the frame means 458 so as to provide for actuation of the trip bar 520 in accordance with the conditions referred to in the previously mentioned Cuttino applications. Further, actuating linkage 529 connected to the switch operating bar 482 (FIG. 7) can be suitably connected to operate a suitably mounted position indicator valve (not shown).

The toggle means 522 which are interconnected between the trip bar 520 and the latching member 496 comprise a mounted supporting frame member 530 on which there is pivotally supported one toggle arm 532 interconnected through junction 534 with latch operating arm 536 which is pivotally secured to the latching arm 496. Toggle actuator 537 is pivotally mounted on the frame 530 and is provided with a toggle arm 538 interconnected through an overcenter actuating spring 540 with the toggle arm 532.

Figure 10:
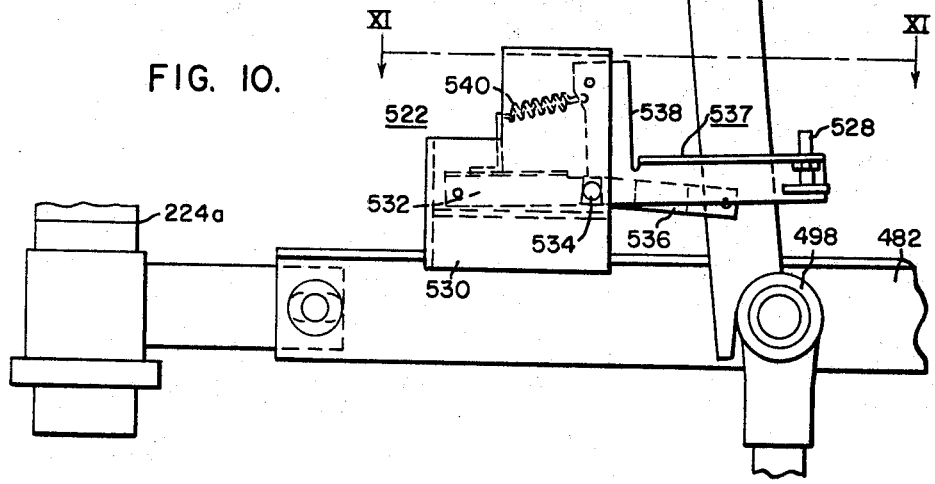
FIG. 10 is similar to FIG. 9 except that the latch is shown holding the operating mechanism in a switch open position.

Normally, the spring 540 urges the arms 532 and 538 to the position shown in FIG. 10. The junction 534 is then located so as to place the arm 536 in the position shown such that the latching arm 496 is engaged with the knob 498. When the trip bar 520 is pivoted as previously described, the actuating portion 528 is deflected downwardly to produce clockwise movement of the arm 538. The toggle arm 532 and the junction 534 are raised to pivot the latching arm 496 in a clockwise direction. The switch bar 482 is then released and rapidly moved upwardly by the springs 500 and 502.

Figure 9:
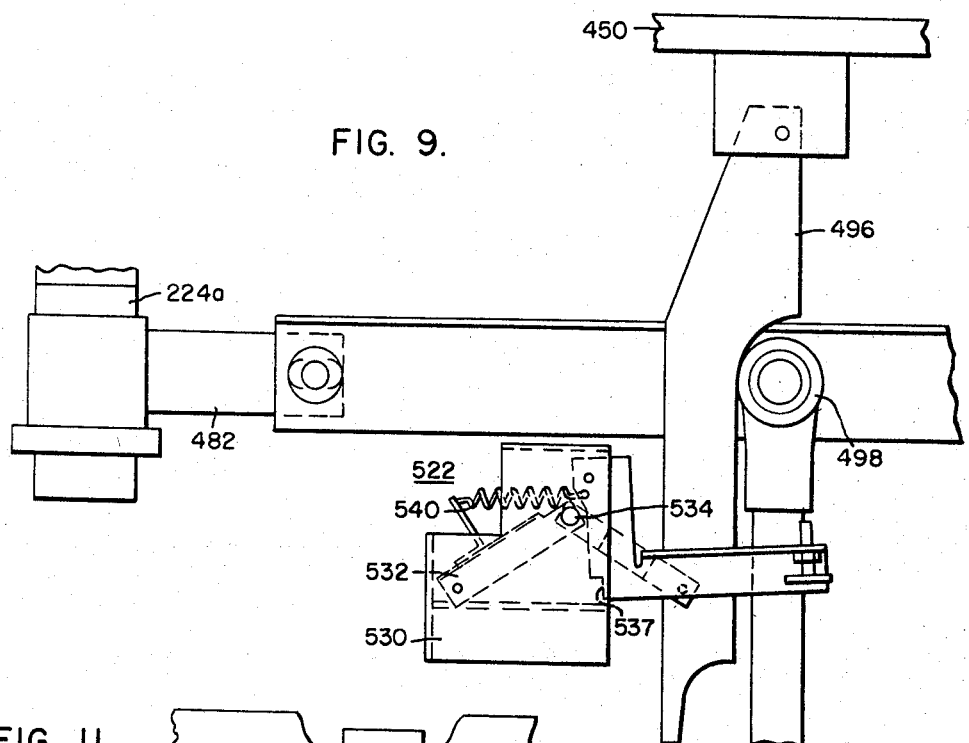
FIG. 9 shows in enlarged detail a latch and overcenter trip means which form a part of the operating mechanism of FIG. 7.
Figure 11:
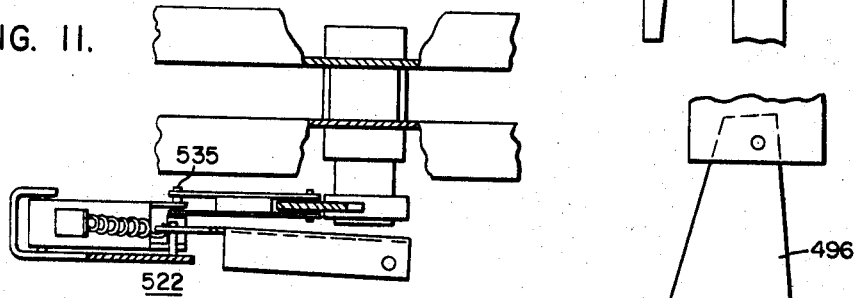
FIG. 11 shows a portion of an enlarged cross section of the operating mechanism and it provides a top view of the overcenter trip means of FIG. 9.

While in switch closed position, the latching member is held in the position shown in FIG. 9 by the knob 498. When the bar 482 is lowered to switch open position, the toggle spring 540 urges the latching arm 496 into the latch position shown in FIG. 10.

In brief summary of the invention, a series capacitor installation is provided with a plurality of series capacitor segments with each of the capacitor segments provided with a load break by-pass switch and gap path for capacitor protection and for variance in the amount of line capacitance. There is included in each by-pass path a combined load break by-pass switching and gap device which is provided with common air blast means both for gap arc extinguishment and load break switch arc extinguishment. The series capacitor segments can thus be inserted into or withdrawn from the line without requiring a main by-pass circuit breaker, and improved series capacitance service is thus provided for the line. Control means provide for gap arc extinguishment under predetermined conditions and for by-pass switching when it is desired to increase or decrease the series capacitance or when certain serious fault conditions arise in the transmission line. The switch and gap device is provided with inter-functioning gap and switch electrode and contact structure through which controlled gas blast is directed for inter-electrode or inter-contact arc extinguishment when required. The inter-functioning nature of the electrode and contact structure is such that the switch opening arc undergoes transference to become an inter-electrode gap arc thereby excellent load interruption capacity for the switch contacts.

The foregoing disclosure has been presented only to illustrate the principles of the invention. Accordingly, it is desired that the invention be not limited by the embodiments described, but rather, that it be accorded an interpretation consistent with the scope and spirit of its broad principles.

I claim as my invention:

1. A protective device for a series capacitor installation, said protective device comprising a common housing, a pair of gap electrodes disposed in the housing in spaced relation to form a protective gap therebetween and adapted to be connected across a capacitor to be protected, means for setting the spacing between said gap electrodes such that the gap between the electrodes will arc over when a predetermined overvoltage is applied across the gap, said gap electrodes having aligned openings therethrough, a stationary switch contact disposed in the housing adjacent one of the gap electrodes, a movable switch contact in the housing movable through said openings in the gap electrodes into and out of engagement with the stationary switch contact, the switch contacts being adapted to be connected to by-pass a capacitor, and means for directing a blast of gas into the housing to extinguish arcs between the gap electrodes or between the switch contacts.

2. The protective device of claim 1 in which the movable switch contact is a tubular member extending to the outside of the housing and having an opening for discharge of said gas.

3. The protective device of claim 2 having spring means for biasing the movable switch contact to closed position, means for moving the movable switch contact to open position, and latch means for holding the movable switch contact in open position.

4. A combined protective gap device and by-pass switch comprising a common housing, a pair of gap electrodes disposed in the housing in spaced relation to form a protective gap therebetween, means for setting the spacing between said gap electrodes such that the gap between the electrodes will arc over when a predetermined overvoltage is applied across the gap, said gap electrodes having aligned openings therethrough, a stationary switch contact adjacent one of the gap electrodes, a movable switch contact movable through said openings in the gap electrodes into and out of engagement with the stationary switch contact, and means for directing a blast of gas through the space between the gap electrodes to extinguish arcs between the gap electrodes or between the switch contacts.

5. The device of claim 4 in which the movable switch contact is a tubular member extending to the outside of the housing to discharge said gas.

6. The device of claim 5 having operating means for the switch contacts including means for biasing the movable switch contact into engagement with the stationary switch contact, and means for releasably holding the movable switch contact in open position out of engagement with the stationary switch contact.

7. A combined protective gap device and by-pass switch comprising a common housing, first and second gap electrodes disposed in the housing, said first gap electrode being a generally cup-shaped member having a central opening therethrough and the second gap electrode being a generally cylindrical tubular member, the second gap electrode extending into the first gap electrode in alignment with said opening and being spaced from the first gap electrode to form a protective gap therewith, a stationary switch contact in the housing outside the first gap electrode and aligned with said opening, a movable switch contact disposed within the tubular second gap electrode, the movable switch contact being a tubular rod-like member and being movable through the second gap electrode and through the opening in the first gap electrode for movement into and out of engagement with the stationary switch contact, and means for directing a blast of gas to flow through the space between the gap electrodes ot extinguish arcs between the gap electrodes or between the switch contacts, the gas escaping through the tubular movable switch contact.

8. A combined protective gap device and by-pass switch as defined in claim 7 and having operating means for the switch contacts including means for biasing the movable switch contact into engagement with the stationary switch contact, and means for releasably holding the movable switch contact in open position out of engagement with the stationary switch contact.

9. A combined protective gap and by-pass switch as defined in claim 7 and having operating means for the switch contacts including spring means for biasing the movable switch contact into engagement with the stationary switch contact, means for moving the movable switch contact to open position out of engagement with the stationary switch contact, latch means for holding the movable switch contact in open position, and means for releasing the latch means to permit the movable switch contact to move into engagement with the stationary switch contact.

References Cited

UNITED STATES PATENTS

| | | | |
|---|---|---|---|
| 2,351,988 | 6/1944 | Marbury et al. | 317—12 |
| 2,576,132 | 11/1951 | Marbury | 317—12 |
| 2,584,710 | 2/1952 | Johnson | 317—12 |
| 2,597,012 | 5/1952 | Marbury | 317—12 |
| 2,599,848 | 6/1952 | Latour | 200—148 |
| 2,949,567 | 8/1960 | Johnson | 317—12 |
| 3,027,439 | 3/1962 | Upton et al. | 200—148 |
| 3,176,104 | 3/1965 | Spinnler | 200—146 |
| 3,246,108 | 4/1966 | Colclaser et al. | 200—148 |
| 3,261,954 | 7/1966 | Yonkers | 200—148 |

FOREIGN PATENTS

| | | |
|---|---|---|
| 678,473 | 7/1939 | Germany. |
| 690,442 | 4/1940 | Germany. |
| 1,156,409 | 12/1957 | France. |

ROBERT S. MACON, *Primary Examiner.*